US009783222B2

(12) United States Patent
Tomiyama et al.

(10) Patent No.: US 9,783,222 B2
(45) Date of Patent: Oct. 10, 2017

(54) STEERING SYSTEM

(71) Applicant: JTEKT CORPORATION, Osaka-shi, Osaka (JP)

(72) Inventors: Hiromitsu Tomiyama, Kashihara (JP); Hidenobu Tanaka, Shiki-gun (JP); Masayuki Nagaoka, Kashiba (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/247,232

(22) Filed: Aug. 25, 2016

(65) Prior Publication Data

US 2017/0066468 A1    Mar. 9, 2017

(30) Foreign Application Priority Data

Sep. 3, 2015    (JP) .................. 2015-174014

(51) Int. Cl.
*B62D 1/184*    (2006.01)
(52) U.S. Cl.
CPC .................. *B62D 1/184* (2013.01)
(58) Field of Classification Search
CPC ..................................................... B62D 1/184
See application file for complete search history.

(56) References Cited

U.S. PATENT DOCUMENTS

| | | | | |
|---|---|---|---|---|
| 3,238,797 A | * | 3/1966 | Coughren | F16H 53/00 74/55 |
| 5,377,555 A | * | 1/1995 | Hancock | B62D 1/184 74/107 |
| 7,267,025 B2 | * | 9/2007 | Ko | B62D 1/184 74/493 |
| 7,607,694 B2 | * | 10/2009 | Shinohara | B62D 1/184 280/775 |
| 7,717,011 B2 | * | 5/2010 | Hirooka | B62D 1/184 280/777 |

(Continued)

FOREIGN PATENT DOCUMENTS

| | | |
|---|---|---|
| EP | 2532564 A1 | 12/2012 |
| JP | 2001-055151 A | 2/2001 |
| JP | 2012-201274 A | 10/2012 |

OTHER PUBLICATIONS

Jan. 31, 2017 Search Report issued in European Patent Application No. 16186581.1.

*Primary Examiner* — Drew J Brown
(74) *Attorney, Agent, or Firm* — Oliff PLC

(57) ABSTRACT

A steering system includes a lock mechanism and a releasing member. The lock mechanism includes a clamping shaft inserted through insertion holes in side plates, an operation lever that rotationally operates the clamping shaft, a rotational cam coupled to the clamping shaft so as to be rotatable integrally therewith and movable integrally therewith in an axial direction, a first clamping member that moves the rotational cam in the axial direction with respect to the side plates, and a stopper that restricts a rotation range of the clamping shaft. The releasing member includes a fitting portion located between the side plates and fitted on an outer peripheral surface of the clamping shaft so as to provide a clamping margin, and frictionally slides the fitting portion in the axial direction with respect to the clamping shaft when the rotational cam moves in the axial direction with respect to the side plates.

5 Claims, 9 Drawing Sheets

(56) References Cited

U.S. PATENT DOCUMENTS

| | | | | |
|---|---|---|---|---|
| 8,550,497 | B2 * | 10/2013 | Takezawa | B62D 1/184 280/775 |
| 9,022,427 | B2 * | 5/2015 | Schnitzer | B62D 1/16 280/775 |
| 9,120,502 | B2 * | 9/2015 | Mihara | B62D 1/184 |
| 9,233,706 | B2 * | 1/2016 | Schnitzer | B62D 1/16 |
| 2002/0023515 | A1 * | 2/2002 | Kuroumaru | B62D 1/184 74/493 |
| 2004/0035238 | A1 * | 2/2004 | Jolley | B62D 1/184 74/493 |
| 2006/0230864 | A1 | 10/2006 | Shinohara et al. | |
| 2012/0312117 | A1 * | 12/2012 | Maniwa | B62D 1/184 74/493 |
| 2013/0247708 | A1 | 9/2013 | Hirooka et al. | |

* cited by examiner

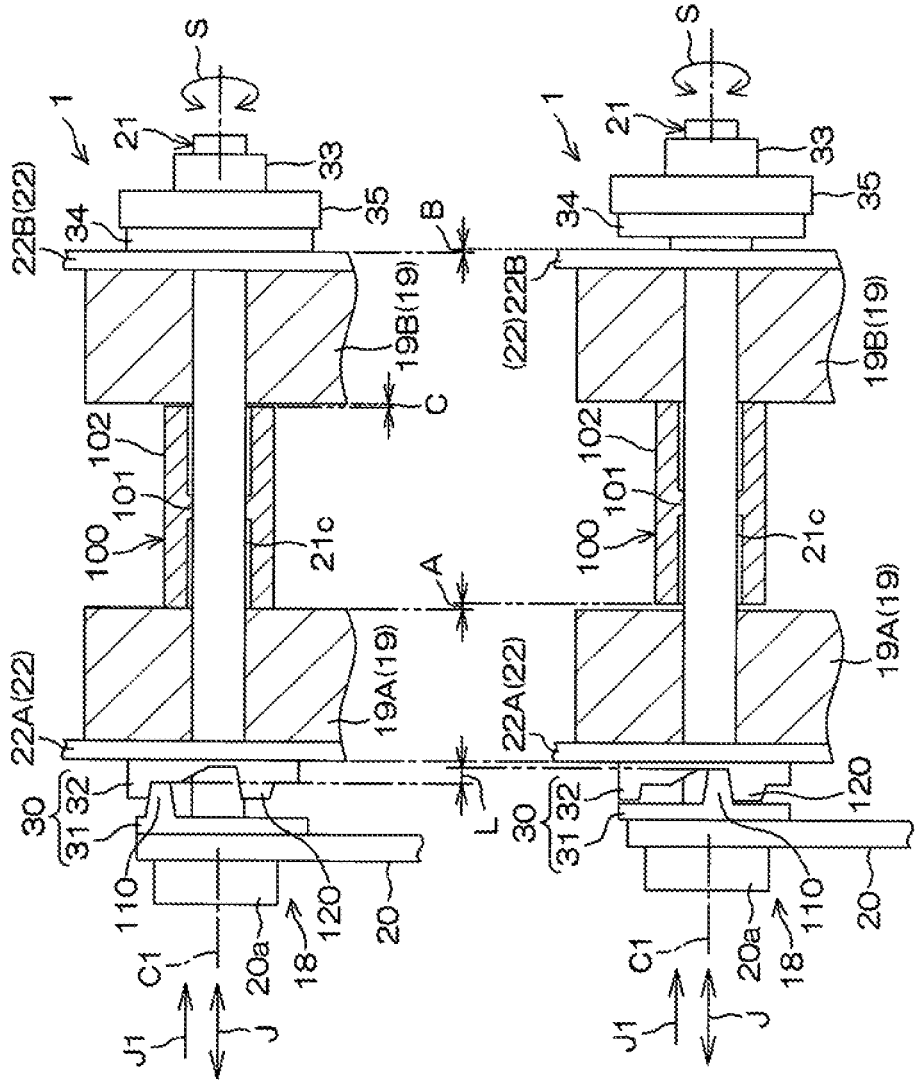

STEERING SYSTEM

INCORPORATION BY REFERENCE

The disclosure of Japanese Patent Application No. 2015-174014 filed on Sep. 3, 2015 including the specification, drawings and abstract, is incorporated herein by reference in its entirety.

BACKGROUND OF THE INVENTION

1. Field of the Invention

The invention relates to a steering system.

2. Description of the Related Art

In a steering system described in Japanese Patent Application Publication No. 2012-201274 (JP 2012-201274 A), a lock bolt penetrates a fixed bracket that supports a movable bracket configured integrally with a steering column. An operation lever is pivotally operated to pivot a driving cam fixed to the lock bolt and a driven cam installed on the fixed bracket to lock (clamp) and unlock (unclamp) the movable bracket on and from the fixed bracket. During unlocking, a stopper of the driving cam and a stopper of the driven cam come into contact with each other to restrict pivoting of the lock bolt.

In the steering system described in JP 2012-201274 A, the movable bracket is deflected by being clamped against the fixed bracket. When the operation lever is pivotally operated to unlock the movable bracket from the fixed bracket, the driving cam receives, via the driven cam, a force of the movable bracket that acts to return the movable bracket to a state before deflection. Consequently, the driving cam pivots rapidly along with the lock bolt (clamping shaft). Thus, when a pivoting range of the clamping shaft is restricted, engagement portions of the stoppers of both cams come into rapid contact (engagement) with each other, resulting in hammering sound.

SUMMARY OF THE INVENTION

An object of the invention is to provide a steering system that suppresses hammering sound generated when engagement portions come into engagement with each other.

According to an aspect of the invention, a steering system includes:

a steering shaft;

a column jacket that supports the steering shaft so that the steering shaft is rotatable;

a bracket fixed to a vehicle body and including a pair of side plates that supports the column jacket;

a lock mechanism including: a clamping shaft that is inserted through insertion holes in the side plates; an operation lever that operates the clamping shaft such that the clamping shaft rotates around a central axis of the clamping shaft; a rotational cam coupled to the clamping shaft so as to be rotatable integrally with the clamping shaft and movable integrally with the clamping shaft in an axial direction thereof; a non-rotational cam that engages with the rotational cam and that is supported by the clamping shaft while permitting the clamping shaft to rotate and move in the axial direction, rotation of the non-rotational cam being restricted by one of the side plates, the non-rotational cam moving the rotational cam in the axial direction with respect to the side plates in conjunction with rotation of the rotational cam; and a stopper including an engagement portion provided on the rotational cam and an engagement portion provided on the non-rotational cam, the engagement portions coming into engagement with each other to restrict a rotation range of the rotational cam, the rotational cam moving in the axial direction with respect to the side plates to clamp the side plates and support the column jacket; and a sliding member including a fitting portion fitted on an outer peripheral surface of the clamping shaft so as to provide a clamping margin, the sliding member frictionally sliding the fitting portion in the axial direction with respect to the clamping shaft when the rotational cam moves in the axial direction with respect to the side plates.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 9A is a schematic diagram depicting a main part of the steering system and illustrating the locked state;

FIG. 9B is a schematic diagram depicting the main part of the steering system and illustrating the unlocked state;

DETAILED DESCRIPTION OF EMBODIMENTS

Figure 1:
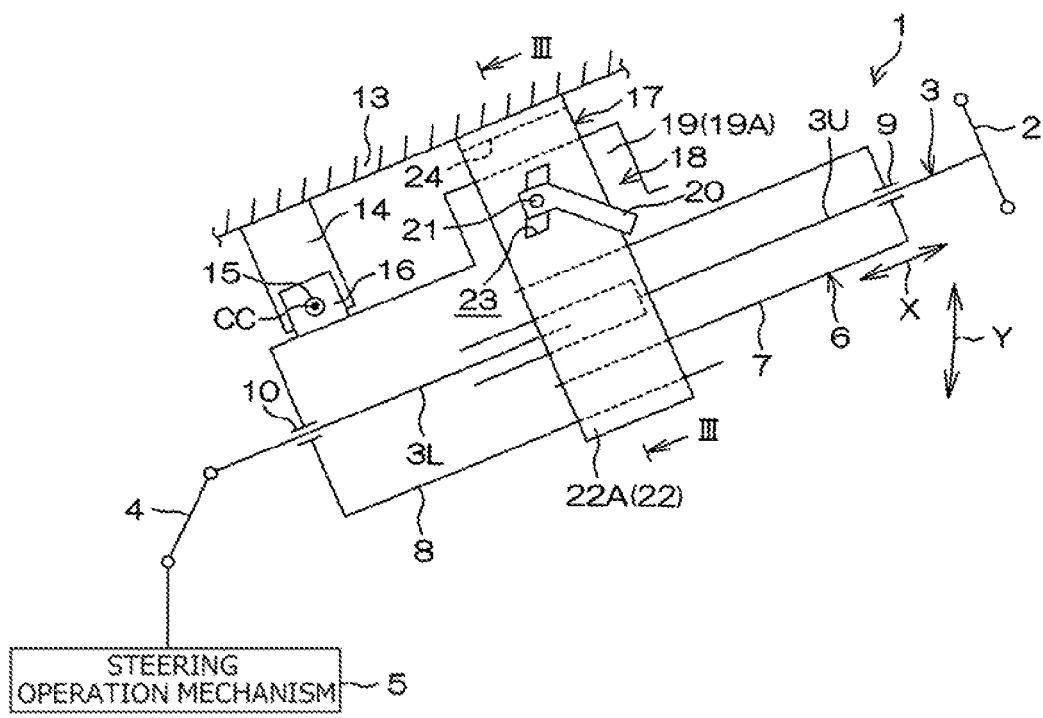
FIG. 1 is a schematic side view of a steering system according to a first embodiment of the invention.

Embodiments of the invention will be described below in detail with reference to the attached drawings. FIG. 1 is a schematic side view of a steering system 1 according to a first embodiment of the invention. As seen in FIG. 1, the steering system 1 includes a steering shaft 3 and a steering operation mechanism 5. A steering member 2 such as a steering wheel is coupled to an end of the steering shaft 3 (an upper end in an axial direction). The steering operation mechanism 5 is coupled to the steering shaft 3 via an intermediate shaft 4 and the like.

The steering operation mechanism 5 is, for example, a rack-and-pinion mechanism that steers steered wheels (not depicted in the drawings) in conjunction with steering of the steering member 2. Rotation of the steering member 2 is transmitted to the steering operation mechanism 5 via the steering shaft 3, an intermediate shaft 4, and the like. The rotation transmitted to the steering operation mechanism 5 is converted into axial movement of a rack shaft (not depicted in the drawings). Consequently, the steered wheels are steered.

The steering shaft 3 includes, for example, a tubular upper shaft 3U and a lower shaft 3L. The upper shaft 3U is fitted by spline fitting or serration fitting so as to be relatively slidable. The steering member 2 is coupled to an end of the upper shaft 3U. The steering shaft 3 can be extended and contracted in a column axial direction. X. The steering system 1 includes a hollow column jacket 6 that supports the steering shaft 3 so that the steering shaft 3 is rotatable. The column jacket 6 includes an upper jacket 7 serving as a tubular inner jacket and a lower jacket 8 fitted on the upper jacket 7 and serving as a tubular outer jacket.

The steering shaft 3 is inserted through the column jacket 6 and rotatably supported via a plurality of bearings 9, 10 by the column jacket 6. The upper jacket 7 is coupled to the upper shaft 3U so as to be movable via the bearing 9 in the column axial direction X along with the upper shaft 3U. The lower jacket 8 supports the lower shaft 3L via the bearing 10. The upper jacket 7 moves in the column axial direction X with respect to the lower jacket 8 to enable the column jacket 6 to be extended and contracted in the column axial direction X along with the steering shaft 3.

The steering system 1 includes a fixed bracket 14, a tilt center shaft 15, and a column bracket 16. The fixed bracket 14 is fixed to a vehicle body 13. The tilt center shaft 15 is supported by the fixed bracket 14. The column bracket 16 is fixed to an outer periphery of the lower jacket 8 and rotatably supported by the tilt center shaft 15. The column jacket 6 and the steering shaft 3 can pivot (tilt) in a tilt direction Y using, as a support, a tilt center CC that is a central axis of the tilt center shaft 15.

The steering shaft 3 and the column jacket 6 are pivoted (tilted) around the tilt center CC so that the position of the steering member 2 can be adjusted (what is called tilt adjustment). The steering shaft 3 and the column jacket 6 are extended and contracted in the column axial direction X so that the position of the steering member 2 can be adjusted (what is called telescopic adjustment).

Figure 2:
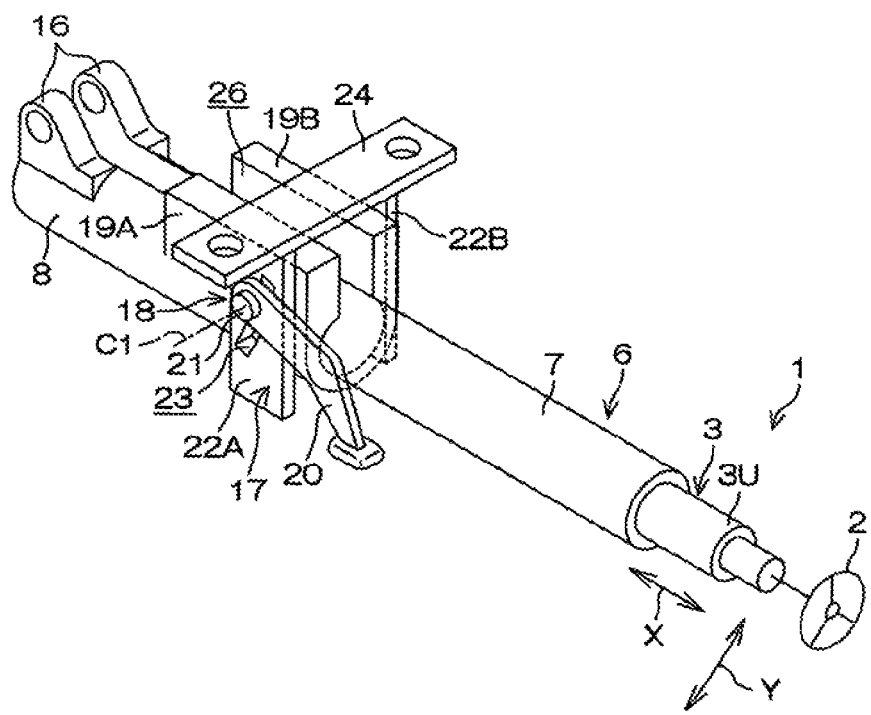
FIG. 2 is a schematic perspective view of the steering system.

The steering system 1 includes a bracket 17 and a lock mechanism 18. The bracket 17 includes an attachment plate 24 fixed to the vehicle body 13. The lock mechanism 18 achieves tilt locking and telescopic locking by clamping a pair of clamped portions 19 integrally provided on an upper portion of the lower jacket 8 in the column axial direction X to support the column jacket 6. As depicted in FIG. 1 and FIG. 2 that is a schematic perspective view of the steering system 1, the lock mechanism 18 includes a clamping shaft 21 and an operation lever 20. The clamping shaft 21 is inserted through tilting insertion holes 23 formed in a first side plate 22A and a second side plate 22B (collectively referred to as a pair of side plates 22 or simply side plates 22) of the bracket 17 to clamp the clamped portions 19. The operation lever 20 is an operation member that rotationally operates the clamping shaft 21. A central axis C1 of the clamping shaft 21 corresponds to a rotation center of the operation lever 20.

As depicted in FIG. 2, the lower jacket 8 includes a slit 26 extending downward from an upper end in the column axial direction X. The clamped portions 19 are disposed at opposite sides of the slit 26. The clamped portion 19 depicted on the left in the drawing plane of FIG. 2 and closer to the viewer is hereinafter sometimes referred to as a first clamped portion 19A. The clamped portion 19 depicted on the right in the drawing plane of FIG. 2 and farther from the viewer is hereinafter sometimes referred to as a second clamped portion 19B. The lower jacket 8 can be elastically reduced in diameter by clamping the clamped portions 19.

Figure 3:
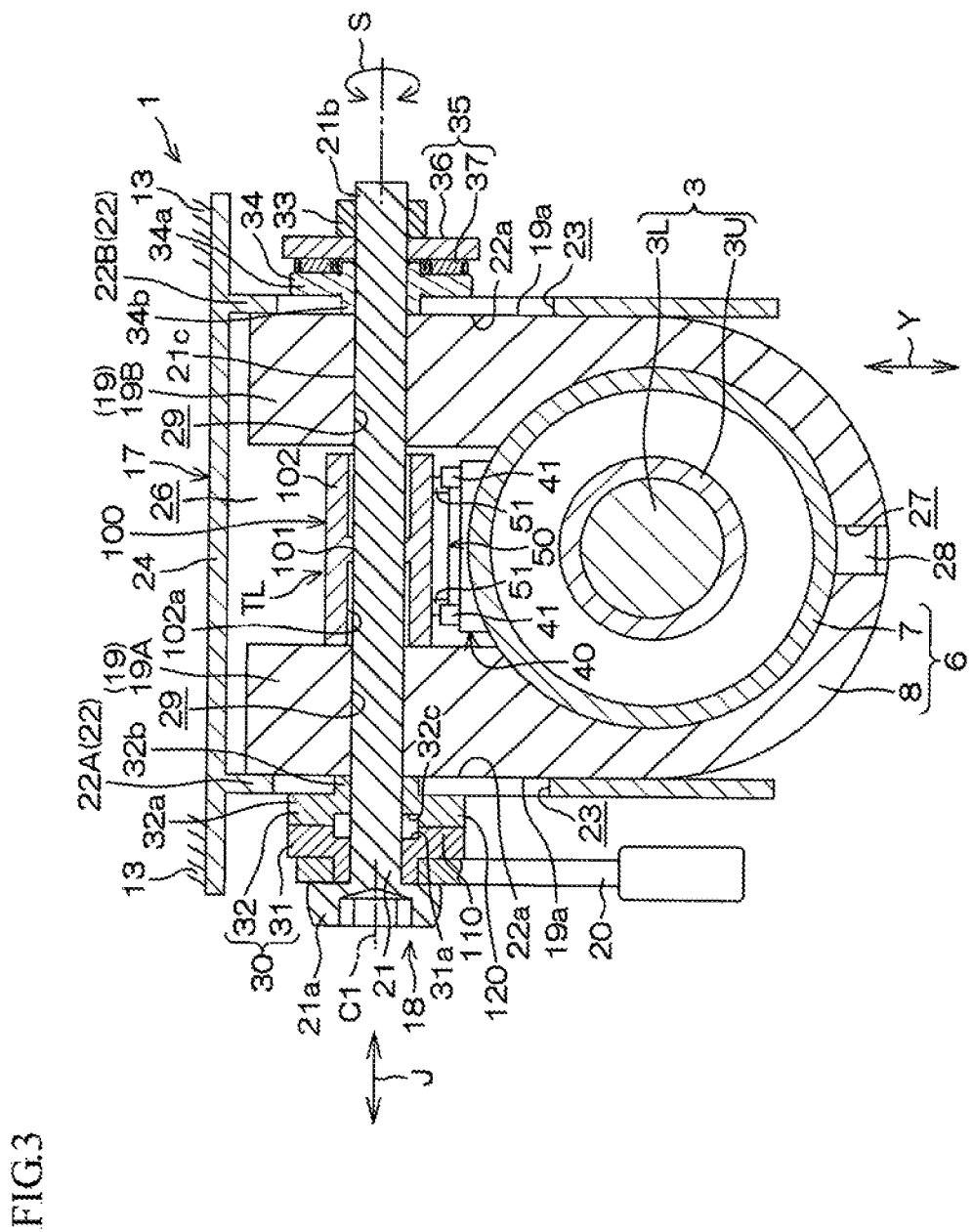
FIG. 3 is a sectional view of the steering system taken along line in FIG. 1.

FIG. 3 is a sectional view taken along line in FIG. 1. As depicted in FIG. 3, the bracket 17 includes the attachment plate 24 and the pair of side plates 22. The attachment plate 24 is attached to the vehicle body 13. The side plates 22 extend downward from opposite ends of the attachment plate 24 in the tilt direction Y to support the column jacket 6. The lower jacket 8 forms a guide groove 27 extending in the column axial direction X. A guided protrusion 28 fixed to the upper jacket 7 is fitted in the guide groove 27. The guide groove 27 restricts rotation of the upper jacket 7 with respect to the lower jacket 8 while guiding axial movement of the upper jacket 7 via the guided protrusion 28. An end (not depicted in the drawings) of the guide groove 27 in the column axial direction X comes into contact with the guided protrusion 28. Consequently, the upper jacket 7 is prevented from slipping out from the lower jacket 8.

The clamped portions 19 of the lower jacket 8 are disposed between the side plates 22 and shaped like plates extending along inner side surfaces 22a of the respective side plates 22. The inner side surfaces 22a of the side plates 22 face outer side surfaces 19a of the respective clamped portions 19. The clamping shaft 21 is formed of a bolt inserted through the insertion holes 23 in the side plates 22 of the bracket 17 and clamping shaft insertion holes 29 in the clamped portions 19 of the lower jacket 8. A head portion 21a with a large diameter provided at one end of the clamping shaft 21 is fixed so as to be rotatable integrally with the operation lever 20.

The lock mechanism 18 further includes a motion converting mechanism 30 interposed between the head portion 21a of the clamping shaft 21 and the first side plate 22A (the side plate 22 depicted on the left in the drawing plane of FIG. 3). The motion converting mechanism 30 converts rotation of the clamping shaft 21 into movement of the clamping shaft 21 in an axial direction J (the direction of the central axis of the clamping shaft 21) with respect to the side plates 22. The motion converting mechanism 30 is also a force converting mechanism that converts an operational torque of the operation lever 20 into an axial force (a clamping force applied to clamp the side plates 22).

The motion converting mechanism 30 includes a rotational cam 31 and a first clamping member 32. The rotational cam 31 is coupled to the operation lever 20 so as to be rotatable integrally with the operation lever 20 and is coupled to the clamping shaft 21 so as to be rotatable integrally with the clamping shaft 21 and movable integrally with the clamping shaft 21 in the axial direction J. The first clamping member 32 is a non-rotational cam that cam-engages with the rotational cam 31 to clamp the first side plate 22A. The lock mechanism 18 further includes a nut 33, a second clamping member 34, and an interposition member 35. The nut 33 is threaded on a threaded portion 21b at the other end of the clamping shaft 21. The second clamping member 34 clamps the second side plate 22B (the side plate 22 depicted on the right in the drawing plane of FIG. 3). The interposition member 35 is interposed between the second clamping member 34 and the nut 33. The interposition member 35 includes a washer 36 and a needle roller bearing 37.

Both the second clamping member 34 and the interposition member 35 are interposed between the nut 33 and the second side plate 22B of the bracket 17. The rotational cam 31, the first clamping member 32 (non-rotational cam), the second clamping member 34, and the interposition member 35 are supported by an outer periphery of the clamping shaft 21. The first clamping member 32 (non-rotational cam) and the second clamping member 34 have clamping plate portions 32a, 34a that clamp the respective side plates 22 and boss portions 32b, 34b fitted in the respective insertion holes 23. Fitting of the boss portions 32b, 34b in the respective insertion holes 23 restricts rotation of the clamping members 32, 34. Specifically, rotation of the first clamping member 32 is restricted by the first side plate 22A (one of the side plates 22). Rotation of the second clamping member 34 is restricted by the second side plate 22B (the other of the side plates 22).

The first clamping member 32 (non-rotational cam) and the second clamping member 34 are supported by the clamping shaft 21 so as to be movable in the axial direction J while permitting the clamping shaft 21 to rotate and move in the axial direction J. In conjunction with an operation of rotating the operation lever 20 in a locking direction, the rotational cam 31 rotates with respect to the first clamping member 32 (non-rotational cam). This moves the first clamping member 32 in the axial direction to clamp the side plates 22 of the bracket 17 between (the clamping plate portions 32a, 34a of) the clamping member 32, 34.

Consequently, the side plates 22 of the bracket 17 clamp the respective clamped portions 19 of the lower jacket 8. As a result, movement of the lower jacket 8 in the tilt direction Y is restricted to achieve tilt locking. Both clamped portions 19 are clamped to elastically reduce the lower jacket 8 in diameter and clamp the upper jacket 7. This restricts movement of the upper jacket 7 in the column axial direction X to achieve telescopic locking. As described above, the lock mechanism 18 achieves telescopic locking based on friction between the jackets 7, 8.

Figure 4:
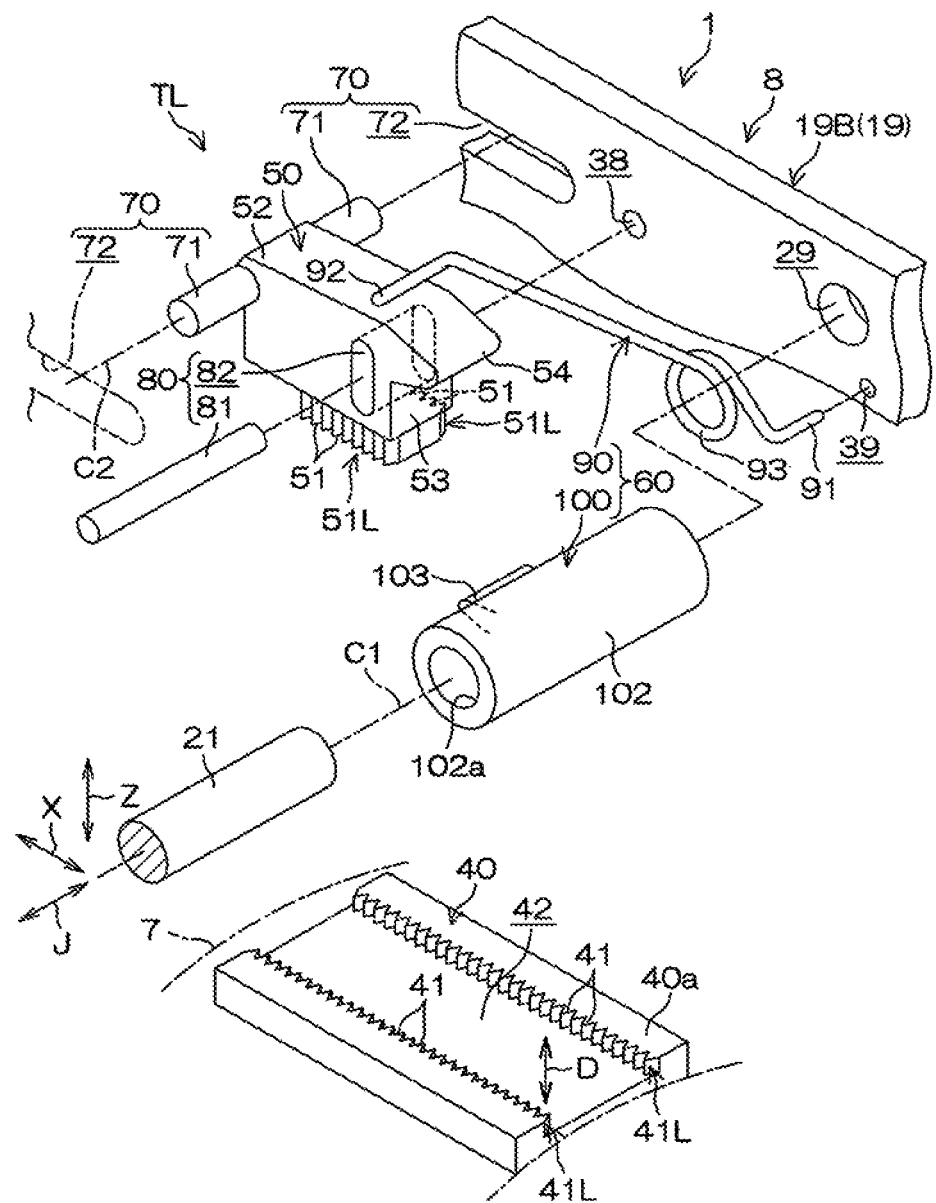
FIG. 4 is a schematic exploded perspective view of a tooth lock mechanism.
Figure 5A:
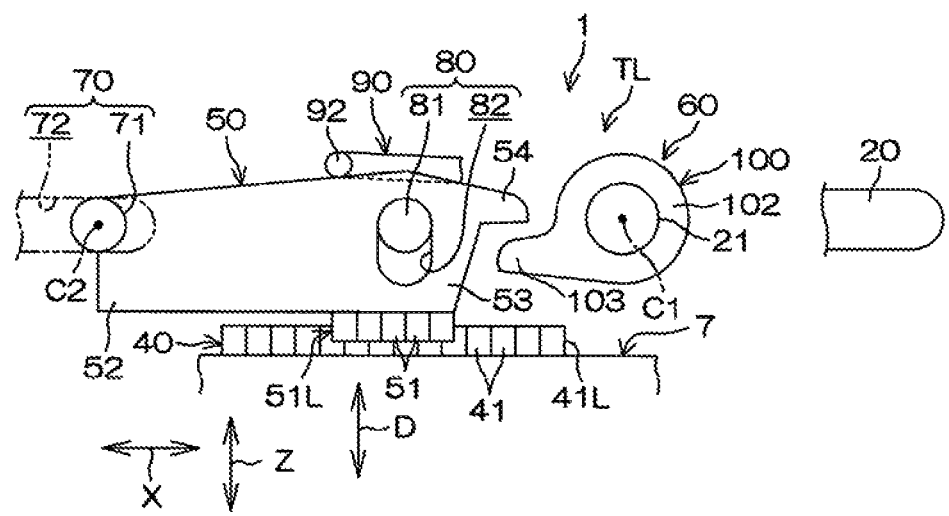
FIG. 5A is a schematic side view of the tooth lock mechanism depicting a locked state.

As depicted in FIG. 4, the steering system 1 further includes a tooth lock mechanism TL having teeth that mesh with one another when the lock mechanism 18 performs clamping in order to stabilize initial restraint in a telescopic direction (corresponding to the column axial direction X) at the time of a secondary collision (in other words, in order to maintain the telescopic position of the upper jacket 7 at an initial stage of the secondary collision). As seen in FIG. 4 and FIG. 5A that is a schematic side view, the tooth lock mechanism TL includes a first tooth forming member 40, a second tooth forming member 50, and an interlocking mechanism 60. The first tooth forming member 40 forms first teeth 41 and moves integrally with the upper jacket 7 in the column axial direction X. The second tooth forming member 50 forms second teeth 51 that mesh with the first teeth 41, and is supported so as to be rotatable around a support. The interlocking mechanism 60 interlocks rotation of the clamping shaft 21 with motion of the second tooth forming member 50.

The second tooth forming member 50 includes a first portion 52 that is supported so as to be rotatable around the support and a second portion 53 that is located away from the first portion 52 and on which the second teeth 51 are formed. The tooth lock mechanism TL includes a first guide mechanism 70 and a second guide mechanism 80. The first guide mechanism 70 guides the first portion 52 in the column axial direction X. The second guide mechanism 80 guides the second portion 53 in an orthogonal direction Z orthogonal to the column axial direction X when the first teeth 41 and the second teeth 51 mesh with one another.

As depicted in FIG. 4, the first tooth forming member 40 is formed of a plate material longitudinally extending in the column axial direction X and is fixed to an outer peripheral surface of the upper jacket 7 by welding or the like. The first tooth forming member 40 has a recessed groove 42 formed in a surface 40a of the first tooth forming member 40 so as to extend in the column axial direction X. The recessed groove 42 has a pair of inner wall surfaces extending in the column axial direction X and facing each other in the axial direction J. On the inner wall surfaces, a pair of first tooth rows 41L is formed such that each of the first tooth rows 41L includes the first teeth 41 disposed in the column axial direction X.

Tooth tips of the first teeth 41 of the first tooth rows 41L face one another in the axial direction J. A tooth trace direction D (corresponding to a tooth width direction) of each of the first teeth 41 extends in a depth direction of the recessed groove 42 so as to be orthogonal to both the column axial direction X and the axial direction J. On a surface of the second portion 53 of the second tooth forming member 50 that faces the first tooth forming member 40, a pair of second tooth rows 51L is provided such that a plurality of second teeth 51 is disposed in each of the second tooth rows 51L. As depicted in FIG. 4, tooth tips of the second teeth 51 in the pair of second tooth rows 51L face outward in opposite directions. The second teeth 51 in each of the second tooth rows 51L can mesh with the first teeth 41 in the corresponding first tooth row 41L in the tooth trace direction D.

The first guide mechanism 70 includes a pair of first shafts 71 and a pair of first guide holes 72. The first shafts 71 protrude outward from the first portion 52 of the second tooth forming member 50 in opposite directions. The first guide holes 72 are slots formed in the respective clamped portions 19 of the lower jacket 8 so as to extend in the column axial direction X.

The first guide holes 72 support the respective first shafts 71, inserted through the first guide holes 72, so as to make the first shafts 71 slidable in the column axial direction X. The first shafts 71 have a central axis C2 as the support. The first shafts 71 are guided through the first guide holes 72 so as to be movable in the column axial direction X while remaining parallel to the clamping shaft 21. The second guide mechanism 80 includes a second shaft 81 and a second guide hole 82. The second shaft 81 is supported at opposite ends thereof by support holes 38 in the clamped portions 19 of the lower jacket 8. The second guide hole 82, through which the second shaft 81 is inserted, is a slot formed in the second tooth forming member 50 and extending in the orthogonal direction Z (see also FIG. 5A) when the first teeth 41 mesh with the second teeth 51.

As depicted in FIG. 4 and FIG. 5A, the interlocking mechanism 60 includes a biasing member 90 and a releasing member 100. The biasing member 90 rotationally biases the second tooth forming member 50 around the central axis C2 of the first shafts 71 toward a meshing side (a side on which the second teeth 51 mesh with the first teeth 41). The releasing member 100 drives the second tooth forming member 50 toward a meshing release side against the force of the biasing member 90. The biasing member 90 is a torsion spring including a first end 91, a second end 92, and a coil portion 93. The first end 91 is locked in a locking hole 39 that serves as a locking portion of the second clamped portion 19B. The second end 92 lies on the opposite side of the second tooth forming member 50 from the second teeth 51 and engages with and presses the second portion 53. The coil portion 93 is wound around the clamping shaft 21 between the first end 91 and the second end 92.

As seen in FIG. 3 and FIG. 4, the releasing member 100 is made of resin or metal. The releasing member 100 integrally includes a sleeve 102 and a releasing protrusion 103. The sleeve 102 has, on an inner peripheral surface 102a thereof, a fitting portion 101 that is fitted on an outer peripheral surface 21c of the clamping shaft 21 to surround the clamping shaft 21. The releasing protrusion 103 is a releasing portion that protrudes from an outer periphery of the sleeve 102. As depicted in FIG. 3, in the axial direction J of the clamping shaft 21, the sleeve 102 is disposed between the clamped portions 19 disposed between the side plates 22. Between the clamped portions 19 disposed between the side plates 22, the fitting portion 101 is fitted on the outer peripheral surface 21c of the clamping shaft 21 by interference fitting so as to have a clamping margin.

Consequently, the sleeve 102 can rotate integrally with the clamping shaft 21. The sleeve 102 can slide relative to the clamping shaft 21 in the axial direction J thereof while offering sliding resistance resulting from friction to the clamping shaft 21. The releasing member 100 including the sleeve 102 functions as a sliding member. The clamping margin corresponds to a difference between the bore diameter of the fitting portion 101 before the fitting portion 101 is fitted on the outer peripheral surface 21c of the clamping shaft 21 and the outside diameter of the clamping shaft 21. The fitting portion 101 is a protrusion disposed on a portion of the inner peripheral surface 102a of the sleeve 102 in an axial direction of the sleeve 102 (corresponding to the axial direction J of the clamping shaft 21) and extending all along a circumference of the sleeve 102 or along a part of the circumference of the sleeve 102 (corresponding to a circumferential direction S of the clamping shaft 21).

As seen in FIG. 5A, the releasing protrusion 103 comes into engagement with an engagement protrusion 54 provided on the second portion 53 of the second tooth forming member 50 in conjunction with rotation of the clamping shaft 21 in an unlocking direction. Consequently, the second tooth forming member 50 is rotated toward the meshing release side against the force of the biasing member 90. Rotationally operating the operation lever 20 in the locking direction (counterclockwise in FIG. 5B) rotates the releasing member 100 counterclockwise along with the clamping shaft 21 from a state depicted in FIG. 5B to a state depicted in FIG. 5A.

The releasing protrusion 103 of the releasing member 100 thus disengages from the engagement protrusion 54 of the second tooth forming member 50. Thus, the biasing member 90 rotationally drives the second tooth forming member 50 clockwise around the support (the central axis C2 of the first shafts 71). The second teeth 51 is caused to mesh with the first teeth 41 in the tooth trace direction D (see FIG. 5A). Telescopic locking based on tooth locking is thus achieved.

Figure 5B:
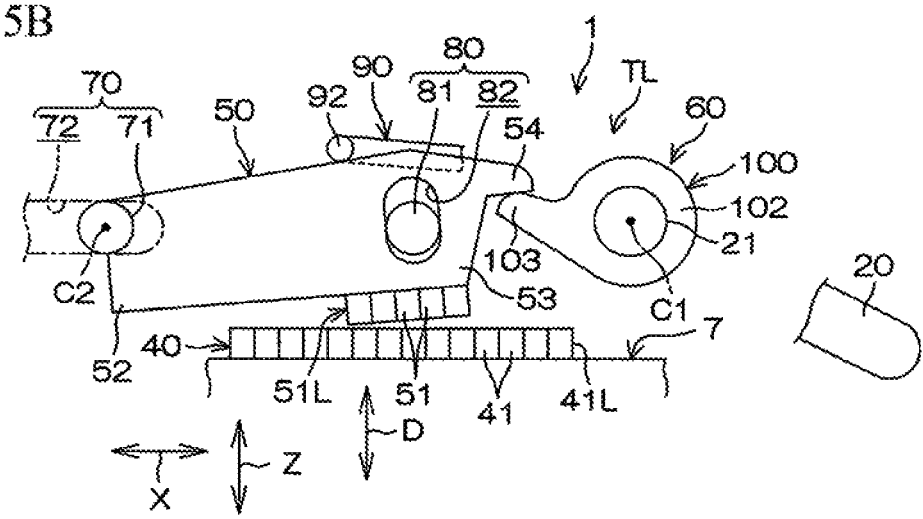
FIG. 5B is a schematic side view of the tooth lock mechanism depicting a unlocked state.

In contrast, rotationally operating the operation lever 20 in the unlocking direction (clockwise in FIG. 5A) rotates the releasing member 100 clockwise along with the clamping shaft 21 from the state depicted in FIG. 5A to the state depicted in FIG. 5B. Accordingly, the releasing protrusion 103 of the releasing member 100 pushes up the engagement protrusion 54 of the second tooth forming member 50. Thus, the second tooth forming member 50 is rotationally driven counterclockwise around the support (the central axis C2 of the first shafts 71). Consequently, the second teeth 51 are separated from the first teeth 41 along the tooth trace direction D to release the meshing (see FIG. 5B). Telescopic locking based on tooth locking is thus released.

Figure 6:
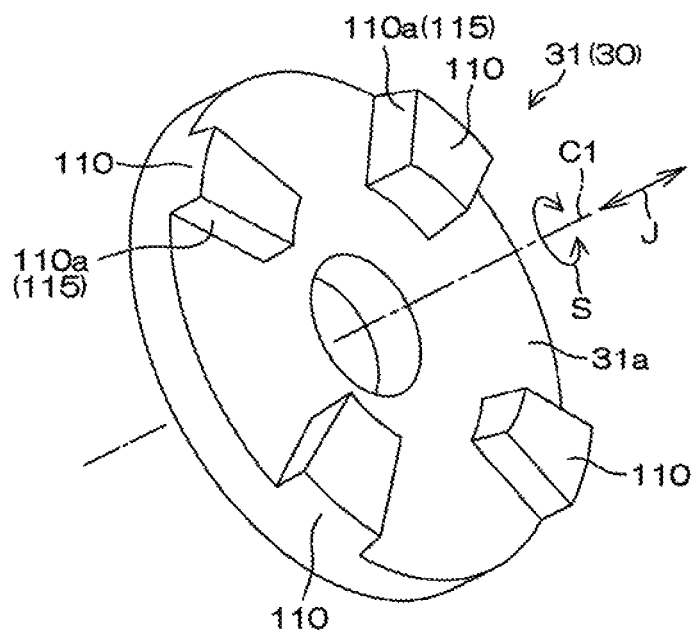
FIG. 6 is a schematic perspective view of a rotational cam of a motion converting mechanism.

Now, the motion converting mechanism 30 and the releasing member 100 will be described in detail. As seen in FIG. 3 and FIG. 6 that is a schematic perspective view of the rotational cam 31 of the motion converting mechanism 30, the rotational cam 31 includes a flat facing surface 31a and a plurality of first cam protrusions 110. The facing surface 31a faces the first clamping member 32 in the axial direction J. The first cam protrusions 110 protrude from the facing surface 31a toward the first clamping member 32. The first cam protrusions 110 are disposed around the central axis C1 of the clamping shaft 21 at regular intervals in the circumferential direction S.

Figure 7:
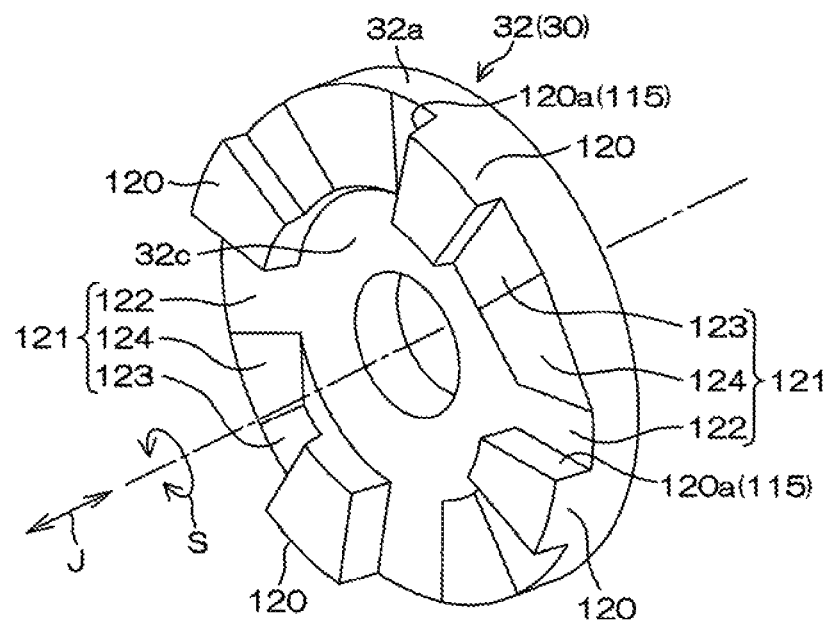
FIG. 7 is a schematic perspective view of a clamping member of the motion converting mechanism.

As seen in FIG. 3 and FIG. 7 that is a schematic perspective view of the first clamping member 32 of the motion converting mechanism 30, the clamping plate portion 32a of the first clamping member 32 includes a flat facing surface 32c, a plurality of second cam protrusions 120, and cam surfaces 121. The facing surface 32c faces the facing surface 31a of the rotational cam 31. The second cam protrusions 120 protrude from the facing surface 32c toward the rotational cam 31. A part of each of the cam surfaces 121 is elevated from the facing surface 32c. Each of the cam surfaces 121 is formed flush with the facing surface 32c and includes a low-level surface 122 located in proximity to the corresponding second cam protrusion 120 in the circumferential direction S. The cam surface 121 includes a high-level surface 123 and an inclined portion 124. The high-level surface 123 is located at a higher level (closer to the rotational cam 31, see FIG. 3) than the low-level surface 122 and close to the corresponding second cam protrusion 120 in the circumferential direction S. The inclined portion 124 connects the low-level surface 122 to the high-level surface 123.

Figure 8A:
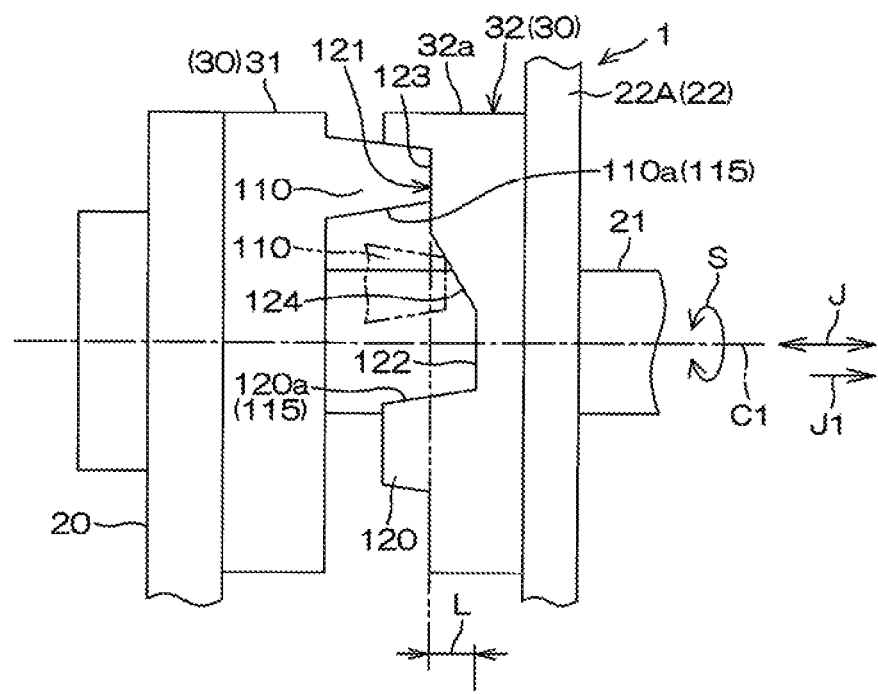
FIG. 8A is a schematic diagram depicting an engagement state between the rotational cam and the clamping member and illustrating the locked state.
Figure 8B:
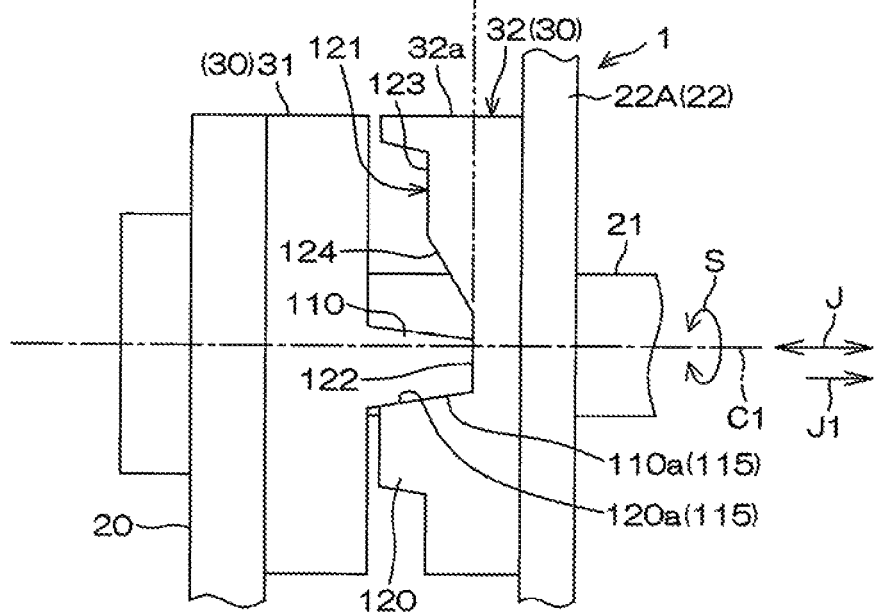
FIG. 8B is a schematic diagram depicting the engagement state between the rotational cam and the clamping member and illustrating the unlocked state.

FIG. 8A and FIG. 8B are schematic diagrams depicting an engagement state between the rotational cam 31 and the first clamping member 32. FIG. 8A depicts the locked state. FIG. 8B depicts the unlocked state. In the locked state depicted in FIG. 8A, the first cam protrusions 110 are in contact with the respective high-level surfaces 123. In the unlocked state depicted in FIG. 8B, the first cam protrusions 110 are in contact with the respective low-level surfaces 122. In the state where the first cam protrusions 110 are in contact with the high-level surface 123 (the state depicted in FIG. 8A), the operation lever 20 is rotationally operated in the unlocking direction. The above-described state changes to the state where the first cam protrusions 110 contact the respective low-level surfaces (the state depicted in FIG. 8B) via a state where the first cam protrusions 110 contact the respective inclined portions 124 (the state depicted by a long dashed double-short dashed line in FIG. 8A). At this time, in conjunction with rotation of the rotational cam 31, the first clamping member 32 moves the rotational cam 31 along with the clamping shaft 21 toward a side J1 in the axial direction J (rightward in the drawing plane of FIGS. 8A and 8B) with respect to the side plates 22.

In contrast, in the unlocked state depicted in FIG. 8B, the operation lever 20 is rotationally operated in the locking direction. In conjunction with rotation of the rotational cam 31, the first clamping member 32 moves the rotational cam 31 along with the clamping shaft 21 toward the opposite side to the side J1 in the axial direction J (leftward in the drawing plane of FIGS. 8A and 8B) with respect to the side plates 22.

Consequently, the first clamping member 32 clamps the side plates 22 between the first clamping member 32 and the second clamping member 34 (see also FIG. 3).

A lift amount L refers to the distance that the rotational cam 31 moves in the axial direction J with respect to the first clamping member 32 between the locked state and the unlocked state, that is, the amount by which the first cam protrusions 110 ride onto the respective cam surfaces 121. The lift amount L also refers to the distance that the clamping shaft 21 moves in the axial direction J with respect to the first side plate 22A between the locked state and the unlocked state. The first cam protrusions 110 and the second cam protrusions 120 engage with one another in a rotating direction of the rotational cam 31 (corresponding to the circumferential direction S) when the operation lever 20 is rotationally operated in the unlocking direction. Specifically, each of the first cam protrusions 110 and each of the second cam protrusions 120 are provided with an engagement surface 110a and an engagement surface 120a, respectively, serving as engagement portions that face each other in the rotating direction of the rotational cam 31 and that engage with each other when the operation lever 20 is rotationally operated in the unlocking direction. The first engagement surface 110a provided on the first cam protrusion 110 and the second engagement surface 120a provided on the second cam protrusion 120 form a stopper 115 that restricts a rotation range of the rotational cam 31. The first engagement surface 110a and the second engagement surface 120a come into contact with each other to restrict rotation of the rotational cam 31.

FIGS. 9A and 9B are schematic diagrams of a main part of the steering system 1. FIG. 9A depicts the locked state. FIG. 9B depicts the unlocked state. For convenience of description, the position of the first side plate 22A in the axial direction J depicted in FIG. 9A coincides with the position of the first side plate 22A in the axial direction J depicted in FIG. 9B (see a long dashed short dashed line). As depicted in FIG. 9A, in the locked state, a clearance C may be provided between the releasing member 100 and the second clamped portion 19B (one of the clamped portions 19 depicted on the right side in the drawing plane of FIG. 9A). The side plates 22 in the locked state, clamped by the lock mechanism 18, are elastically deflected so as to approach each other. By being clamped by the side plates 22, the clamped portions 19 are elastically deflected so as to approach each other along with the side plates 22. The amount by which the side plates 22 and the clamped portions 19 are deflected is denoted by reference numeral B (see also FIG. 9B).

The operation lever 20 is rotationally operated in the unlocking direction to change the locked state in FIG. 9A to the unlocked state in FIG. 9B. The clamping shaft 21 and the rotational cam 31 move toward the side J1 in the axial direction J (rightward in the drawing plane of FIGS. 9A and FIG. 9B) with respect to the first side plate 22A by the lift amount L. The second side plate 22B and the second clamped portion 19B move toward the side J1 in the axial direction J with respect to the first side plate 22A by a distance corresponding to the amount of deflection B.

As seen in FIG. 9A and FIG. 9B, the releasing member 100 fitted on the outer peripheral surface 21c of the clamping shaft 21 moves along with the clamping shaft 21 toward the side J1 in the axial direction J by a distance A equal to the sum of the amount of deflection B and the clearance C (A=B+C) to come into contact with the second clamped portion 19B. Consequently, the position of the releasing member 100 in the axial direction J is restricted by the second side plate 22B via the second clamped portion 19B. As described above, the fitting portion 101 of the releasing member 100 is fitted so as to provide a clamping margin. Thus, when the rotational cam 31 moves with respect to the side plates 22, the fitting portion 101 of the releasing member 100 frictionally slides in the axial direction J with respect to the clamping shaft 21. A sliding distance of the fitting portion 101 corresponds to the difference (L−A) between the lift amount L and the distance A.

In the present embodiment, when the operation lever 20 is rotationally operated in the unlocking direction, the reaction force accumulated in the side plates 22 as a result of the clamping by the lock mechanism 18 is released. Thus, the reaction force is transmitted to the rotational cam 31 via the first clamping member 32 to increase the rotation speed of the rotational cam 31. At this time, the fitting portion 101 of the releasing member 100 frictionally slides with respect to the clamping shaft 21 to reduce the speed of movement of the clamping shaft 21 in the axial direction J. As a result, the rotation speed of the rotational cam 31 is reduced to suppress hammering sound generated when the first engagement surfaces 110a come into engagement with the respective second engagement surfaces 120a. This in turn allows improvement of an operational feeling that a driver has when operating the operation lever 20.

Sliding resistance resulting from friction when the releasing member 100 slides with respect to the clamping shaft 21 can be adjusted by varying a fitting range (fitting length) of the fitting portion 101 or increasing the number of positions where the fitting portion 101 is set, in the axial direction J or the circumferential direction S. The sliding resistance can also be adjusted by varying the clamping margin in interference fitting. Setting of the clearance C between the second clamped portion 19B and the releasing member 100 may be omitted. That is, the releasing member 100 may contact the second clamped portion 19B in the locked state, and a clearance may be provided between the releasing member 100 and the first clamped portion 19A. In this case, the distance A is equal to the amount of deflection B (A=B).

Figure 10:
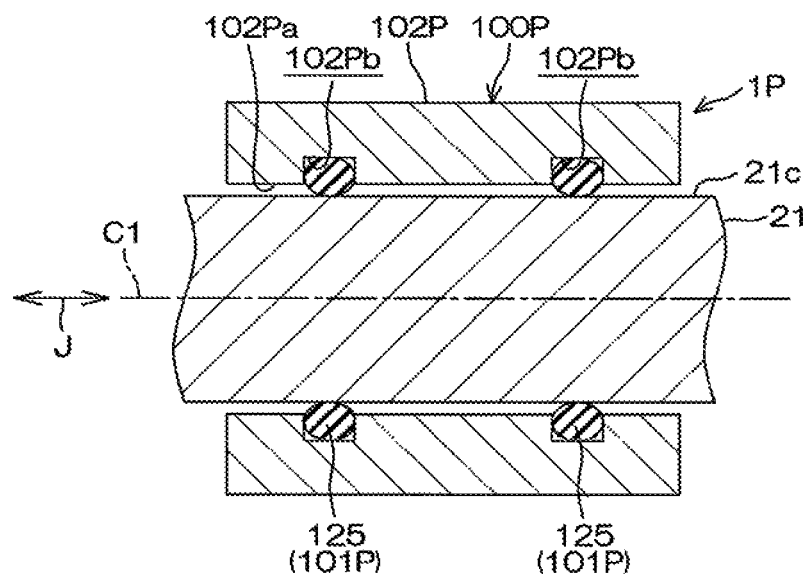
FIG. 10 is a sectional view of a periphery of a main part of a steering system in a second embodiment.
Figure 11:
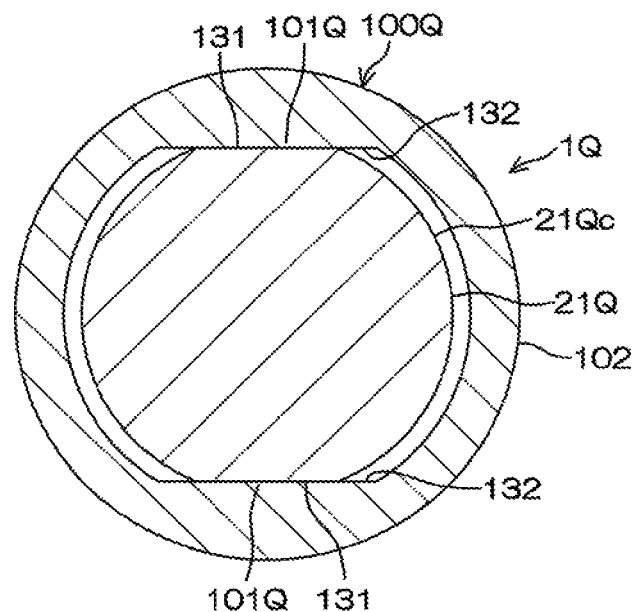
FIG. 11 is a sectional view of a periphery of a main part of a steering system in a third embodiment.
Figure 12:
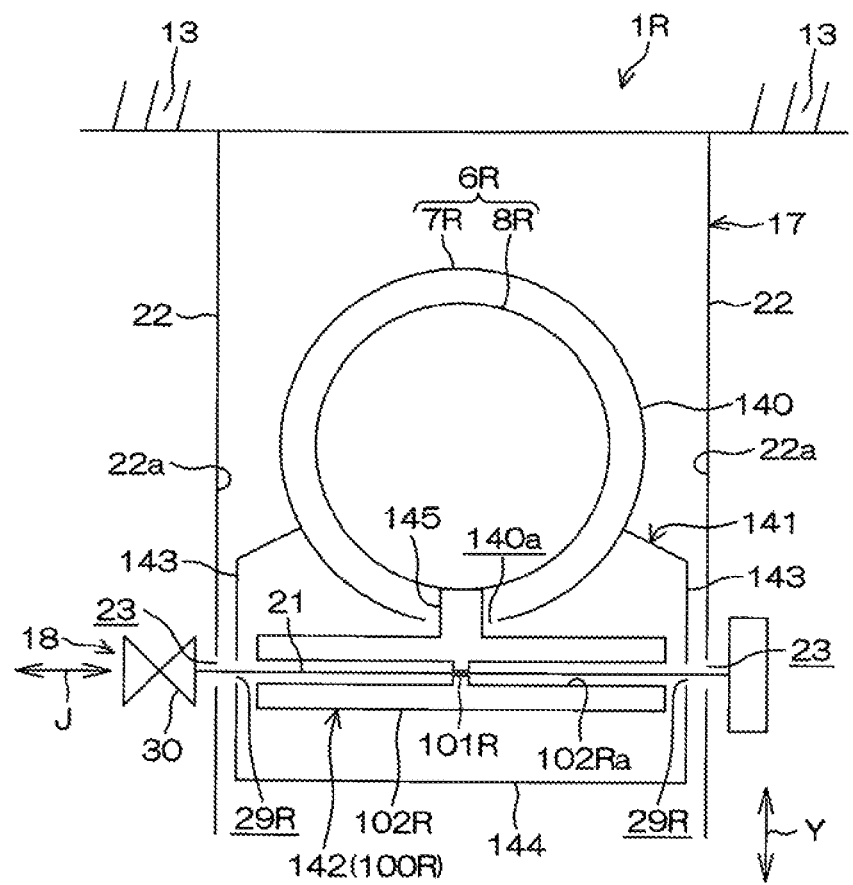
FIG. 12 is a schematic diagram of a steering system in a fourth embodiment.

Although not depicted in the drawings, the sleeve 102 of the releasing member 100 may be inserted through an insertion hole formed in the second clamped portion 19B so as to face the second side plate 22B. In this case, the releasing member 100 is configured such that the position thereof in the axial direction J is restricted by coming into direct contact with the second side plate 22B. FIG. 10 is a sectional view of a periphery of a main part of a steering system 1P in a second embodiment. In FIG. 10 and FIGS. 11 and 12 described below, members that are the same as those described above are denoted by the same reference numerals and description thereof will be omitted.

The steering system 1P in the second embodiment depicted in FIG. 10 is different from the steering system 1 in the first embodiment depicted in FIG. 3 as follows. A releasing member 100P of the steering system 1P serving as a sliding member includes a sleeve 102P and annular elastic members 125. The annular elastic members 125 are fitting portions 101P that are held on an inner peripheral surface 102P of the sleeve 102P and that are elastically fitted on the outer peripheral surface 21c of the clamping shaft 21.

The annular elastic members 125 may be, for example, O rings. The annular elastic members 125 are housed in annular grooves 102Pb formed in the inner peripheral surface 102Pa. When a plurality of the annular elastic members 125 is provided as in the second embodiment, the number of annular grooves 102Pb formed is the same as the number of the annular elastic members 125.

The second embodiment produces the same effects as the first embodiment. Sliding resistance resulting from friction when the releasing member 100P slides with respect to the clamping shaft 21 can be adjusted by changing the number of annular elastic members 125, specifications such as sectional area and elastic modulus, and the clamping margin. FIG. 11 is a sectional view of a periphery of a main part of a steering system 1Q in a third embodiment.

The steering system 1Q in the third embodiment depicted in FIG. 11 is different from the steering system 1 in the first embodiment depicted in FIG. 3 as follows. An outer peripheral surface 21Qc of a clamping shaft 21Q of the steering system 1Q includes a pair of first flat portions 131 having a width across flats formed therebetween. A fitting portion 101Q of a releasing protrusion 100Q serving as a sliding member includes a pair of second flat portions 132 fitted on the first flat portions 131 so as to provide a clamping margin. The clamping margin of the fitting portion 101Q with respect to the outer peripheral surface 21Qc corresponds to a difference between the dimension between the first flat portions 131 and a dimension between the second flat portions 132 before the fitting portion 101Q is fitted on the clamping shaft 21Q.

The third embodiment produces the same effects as the first embodiment. Sliding resistance resulting from friction when the releasing member 100Q slides with respect to the clamping shaft 21Q can be adjusted by changing the clamping margin of the first flat portions 131 and the second flat portions 132. FIG. 12 is a schematic diagram of a steering system 1R in a fourth embodiment.

The invention is applicable to a frictional-locking steering system 1R that does not include the tooth lock mechanism TL. The steering system 1R in the fourth embodiment depicted in FIG. 12 is different from the steering system 1 in the first embodiment depicted in FIG. 3 as follows. The steering system 1R includes a pressing cam 142 serving as a sliding member. A column jacket 6R of the steering system 1R includes an upper jacket 7R serving as an outer jacket and a lower jacket 8R serving as an inner jacket and fitted in the upper jacket 7R.

The upper jacket 7R includes a tubular portion 140 externally fitted on the lower jacket 8R and a support bracket 141 fixed to the tubular portion 140. The lower jacket 8R does not include the clamped portions 19 (see FIG. 3) in the first embodiment. The support bracket 141 includes a pair of plate portions 143 and a coupling portion 144. The plate portions 143 are a pair of clamped portions supported by the pair of side plates 22. The coupling portion 144 couples lower ends of the plate portions 143 together in the tilt direction Y. The plate portions 143 extend along inner side surfaces 22a of the respective side plates 22. Upper ends of the plate portions 143 in the tilt direction Y are fixed to the tubular portion 140. The clamping shaft 21 is inserted through clamping shaft insertion holes 29R formed in the respective plate portions 143 of the support bracket 141 so as to extend in the column axial direction X.

The pressing cam 142 is disposed between the plate portions 143, which are disposed between the side plates 22. The pressing cam 142 includes a sleeve 102R and a cam protrusion 145. The sleeve 102R has a fitting portion 101R provided on an inner peripheral surface 102Ra and fitted on the clamping shaft 21 The cam protrusion 145 protrudes from an outer peripheral surface of the sleeve 102R. The sleeve 102R and the fitting portion 101 R fulfill the same functions as the sleeve 102 and the fitting portion 101 (see FIG. 3) in the first embodiment. The cam protrusion 145 rotates along with the clamping shaft 21, and in the locked state, presses the lower jacket 8 through a hole 140a formed in the tubular portion 140. Consequently, the lower jacket 8R is pressed against an inner peripheral surface of the tubular portion 140 of the upper jacket 7R to cause friction, thereby telescopic locking is assisted.

The fourth embodiment produces the same effects as the first embodiment. As the fitting portion 101R in the fourth embodiment, the annular elastic member 125 serving as a fitting portion in the second embodiment (see FIG. 10) or the fitting portion 101Q (see FIG. 11) can be applied. The invention is not limited to the above-described embodiments. Various changes may be made to the embodiments within the scope of the invention.

For example, the steering system 1 is not limited to manual steering systems in which steering of the steering member 2 is not assisted but may be a column assist electric power steering system (C-EPS) in which power of an electric motor is provided to the steering shaft 3 to assist steering of the steering member 2. The steering system 1 is applicable to steering systems not having a tilt adjustment mechanism, that is, steering systems capable of performing only telescopic adjustment. The steering system 1 is applicable to steering systems not having a telescopic adjustment mechanism, that is, steering systems capable of performing only tilt adjustment.

The engagement portions of the stopper 115 may be provided separately from each of the cam protrusions 110, 120 in the cams 31, 32. Elastically deformable rubber or the like may be provided between engagement portions of the cams 31, 32 facing each other in the circumferential direction S. The sliding member may be provided between the first clamping member 32 and the outer peripheral surface 21c of the clamping shaft 21.

At least one of the clamped portions 19 may form a sliding member. That is, on an inner peripheral surface of the clamping shaft insertion hole 29 in the clamped portion 19, a fitting portion is formed which is fitted on the outer peripheral surface of the clamping shaft 21 so as to provide a clamping margin and which frictionally slides with respect to the clamping shaft 21. In this case, the number of components can be reduced.

What is claimed is:

1. A steering system comprising:
   a steering shaft;
   a column jacket that supports the steering shaft so that the steering shaft is rotatable;
   a bracket fixed to a vehicle body and including a pair of side plates that supports the column jacket;
   a lock mechanism including: a clamping shaft that is inserted through insertion holes in the side plates; an operation lever that operates the clamping shaft such that the clamping shaft rotates around a central axis of the clamping shaft; a rotational cam coupled to the clamping shaft so as to be rotatable integrally with the clamping shaft and movable integrally with the clamping shaft in an axial direction thereof; a non-rotational cam that engages with the rotational cam and that is supported by the clamping shaft while permitting the clamping shaft to rotate and move in the axial direction, rotation of the non-rotational cam being restricted by one of the side plates, the non-rotational cam moving the rotational cam in the axial direction with respect to the side plates in conjunction with rotation of the rotational cam; and a stopper including an engagement portion provided on the rotational cam and an engagement portion provided on the non-rotational cam, the engagement portions coming into engagement with each other to restrict a rotation range of the rotational cam, the rotational cam moving in the axial direction with respect to the side plates to clamp the side plates and support the column jacket; and
   a sliding member including a fitting portion fitted on an outer peripheral surface of the clamping shaft so as to provide a clamping margin, the sliding member frictionally sliding the fitting portion in the axial direction with respect to the clamping shaft when the rotational cam moves in the axial direction with respect to the side plates.

2. The steering system according to claim 1, wherein the sliding member is annular, and the fitting portion is disposed on a part of the sliding member in the axial direction or in a circumferential direction.

3. The steering system according to claim 2, wherein the fitting portion is fitted on the outer peripheral surface of the clamping shaft by interference fitting.

4. The steering system according to claim 2, wherein the sliding member includes a sleeve that surrounds the clamping shaft and at least one annular elastic member held on an inner peripheral surface of the sleeve and elastically fitted on the outer peripheral surface of the clamping shaft, the annular elastic member serving as the fitting portion.

5. The steering system according to claim 2, wherein the outer peripheral surface of the clamping shaft includes a pair of first flat portions having a width across flats formed therebetween, and the fitting portion includes a pair of second flat portions fitted on the first flat portions.

* * * * *